(12) United States Patent
Von Novak et al.

(10) Patent No.: US 8,796,887 B2
(45) Date of Patent: *Aug. 5, 2014

(54) ADAPTIVE IMPEDANCE TUNING IN WIRELESS POWER TRANSMISSION

(71) Applicant: QUALCOMM Incorporated, San Diego, CA (US)

(72) Inventors: William H. Von Novak, San Diego, CA (US); Charles E. Wheatley, San Diego, CA (US); Stanley S. Toncich, San Diego, CA (US); Ernest T. Ozaki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/720,835

(22) Filed: Dec. 19, 2012

(65) Prior Publication Data

US 2013/0113299 A1    May 9, 2013
US 2014/0070621 A9    Mar. 13, 2014

Related U.S. Application Data

(63) Continuation of application No. 12/713,123, filed on Feb. 25, 2010, now Pat. No. 8,338,991.

(60) Provisional application No. 61/176,468, filed on May 7, 2009, provisional application No. 61/162,157, filed on Mar. 20, 2009.

(51) Int. Cl.
*H01F 27/42* (2006.01)

(52) U.S. Cl.
USPC ......................................................... 307/104

(58) Field of Classification Search
USPC ........................................................... 307/104
See application file for complete search history.

(56) References Cited

U.S. PATENT DOCUMENTS

| 6,664,770 | B1 | 12/2003 | Bartels |
| 8,338,991 | B2 * | 12/2012 | Von Novak et al. .......... 307/104 |
| 2007/0007821 | A1 | 1/2007 | Rossetti |
| 2008/0018476 | A1 | 1/2008 | Grasset |
| 2009/0067208 | A1 | 3/2009 | Martin et al. |

FOREIGN PATENT DOCUMENTS

| CN | 1083649 C | 4/2002 |
| EP | 0829940 A2 | 3/1998 |

(Continued)

OTHER PUBLICATIONS

International Search Report and Written Opinion—PCT/US2010/028189, International Search Authority—European Patent Office—Jun. 22, 2010.

*Primary Examiner* — Robert L. Deberadinis
(74) *Attorney, Agent, or Firm* — Knobbe Martens Olson & Bear LLP

(57) ABSTRACT

Exemplary embodiments are directed to wireless power. A wireless power receiver includes a receive antenna for coupling with near field radiation in a coupling-mode region generated by a transmit antenna operating at a resonant frequency. The receive antenna generates an RF signal when coupled to the near filed radiation and a rectifier converts the RF signal to a DC input signal. A direct current (DC)-to-DC converter coupled to the DC input signal generates a DC output signal. A pulse modulator generate a pulse-width modulation signal to the DC-to-DC converter to adjust a DC impedance of the wireless power receiver by modifying a duty cycle of the pulse-width modulation signal responsive to at least one of a voltage of the DC input signal, a current of the DC input signal, a voltage of the DC output signal, and a current of the DC output signal.

21 Claims, 9 Drawing Sheets

(56) References Cited

FOREIGN PATENT DOCUMENTS

| EP | 2346141 A1 | 7/2011 |
| TW | I366320 | 6/2012 |
| WO | 0141057 A1 | 6/2001 |
| WO | WO-2010035321 A1 | 4/2010 |

* cited by examiner

ADAPTIVE IMPEDANCE TUNING IN WIRELESS POWER TRANSMISSION

CLAIM OF PRIORITY UNDER 35 U.S.C. §119

This application is a continuation of:

U.S. application Ser. No. 12/713,123 entitled "ADAPTIVE IMPEDANCE TUNING IN WIRELESS POWER TRANSMISSION" filed on Feb. 25, 2010;

This application claims priority under 35 U.S.C. §119(e) to:

U.S. Provisional Patent Application 61/162,157 entitled "WIRELESS POWER IMPEDANCE CONTROL" filed on Mar. 20, 2009; and U.S. Provisional Patent Application 61/176,468 entitled "DC-BASED ADAPTIVE TUNING" filed on May 7, 2009.

BACKGROUND

1. Field

The present invention relates generally to wireless power transfer, and more specifically to devices, systems, and methods related to adaptively tuning impedance in a receiver device to improve wireless power transfer.

2. Background

Typically, each battery powered device such as a wireless electronic device requires its own charger and power source, which is usually an alternating current (AC) power outlet. Such a wired configuration becomes unwieldy when many devices need charging.

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects the radiated power and rectifies it for charging the battery. Antennas are generally of resonant length in order to improve the coupling efficiency. This approach suffers from the fact that the power coupling falls off quickly with distance between the antennas, so charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the electronic device to be charged. This approach has the disadvantage that the spacing between transmit and receive antennas must be very close (e.g., within millimeters). Though this approach does have the capability to simultaneously charge multiple devices in the same area, this area is typically very small and requires the user to accurately locate the devices to a specific area.

Efficiency is of importance in a wireless power transfer system due to the losses occurring in the course of wireless transmission of power. Since wireless power transmission is often less efficient than wired transfer, efficiency is of an even greater concern in a wireless power transfer environment.

As a result, when attempting to provide power to one or more wireless charging devices, there is a need for methods and apparatuses for adapting to changes in coupling between a transmit antenna and a receive antenna to optimize or otherwise adjust power delivery to a receiver device coupled to the receive antenna.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
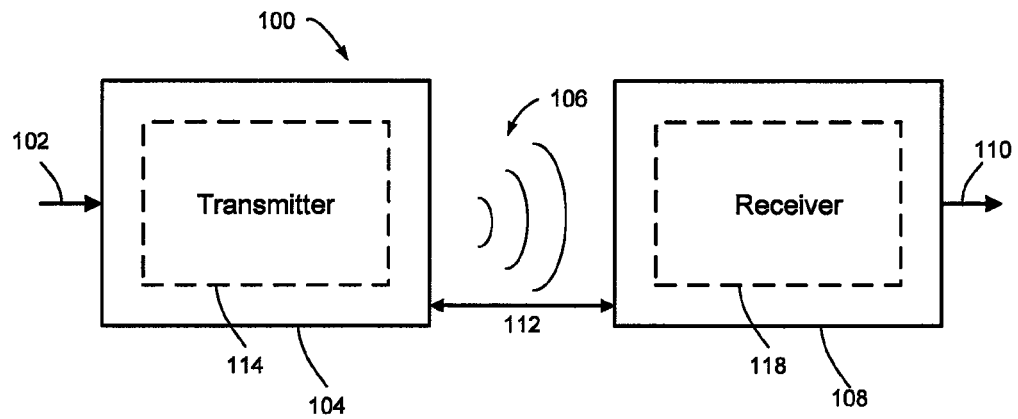
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
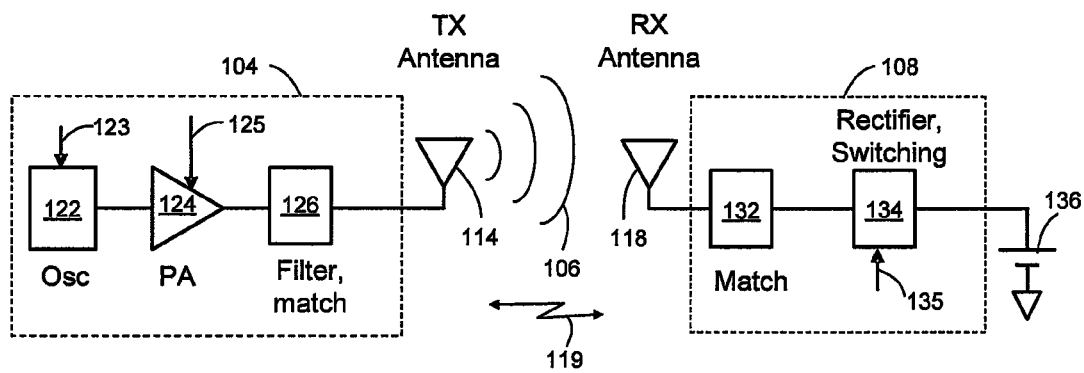
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
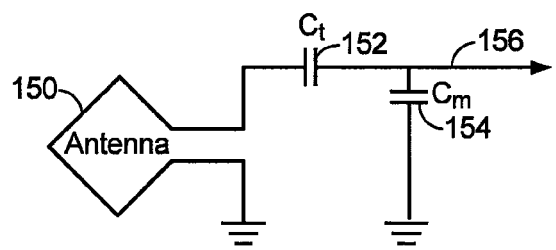
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small receive antenna at significantly larger distances than allowed by far field and inductive approaches mentioned earlier. If the transmit antenna is sized correctly, high coupling levels (e.g., −1 to −4 dB) can be achieved when the receive antenna on a host device is placed within a coupling-mode region (i.e., in the near-field) of the driven transmit loop antenna.

Figure 4:
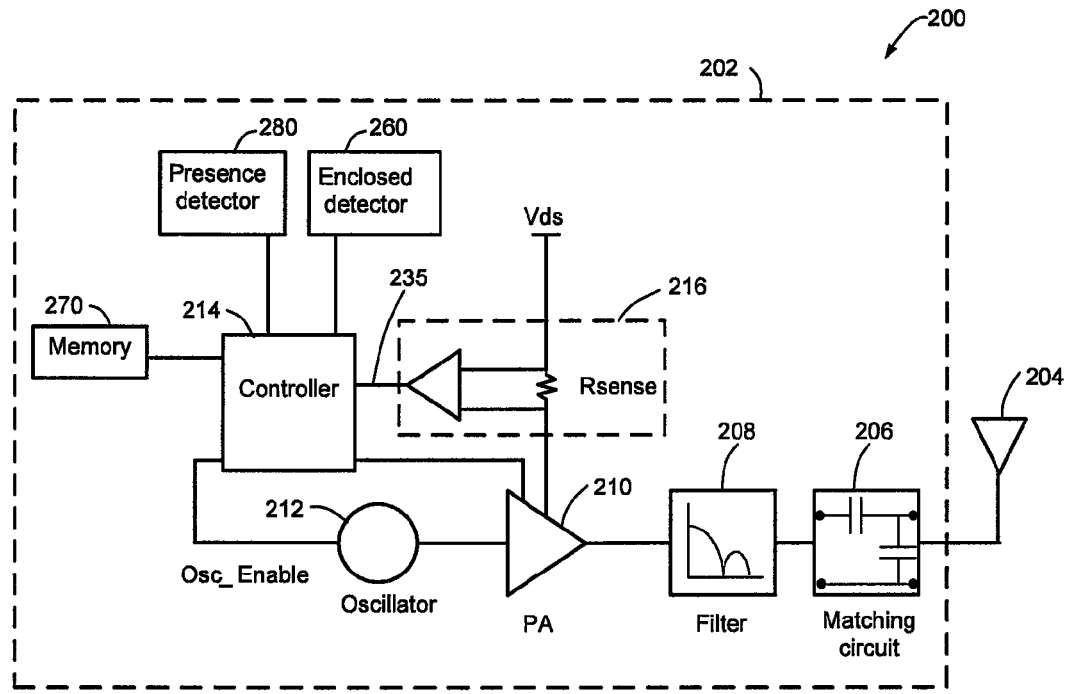
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments for the matching circuit may include inductors and transformers. Other exemplary embodiments for the low pass filter may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212 (also referred to herein as a signal generator). The transmit circuitry may be comprised of discrete devices or circuits, or alternately, may be comprised of an integrated assembly. An exemplary RF power output from transmit antenna 204 may be on the order of 2.5 to 8.0 Watts.

Transmit circuitry 202 further includes a controller 214 for enabling the oscillator 212 during transmit phases (or duty cycles) for specific receivers, for adjusting the frequency of the oscillator, for adjusting the output power level, for implementing a communication protocol for interacting with neighboring devices through their attached receivers. The controller 214 is also for determining impedance changes at the transmit antenna 204 due to changes in the coupling-mode region due to receivers placed therein.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance in order to resonate the transmitting antenna at the desired frequency.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the receiver device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204. Furthermore, the presence detector 280 may be a detector capable of detecting objects placed in the region of the transmit antenna. This may be useful to reduce or stop power output when objects that are not meant to receive wireless power and may be damaged by magnetic fields are placed near the transmit antenna.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
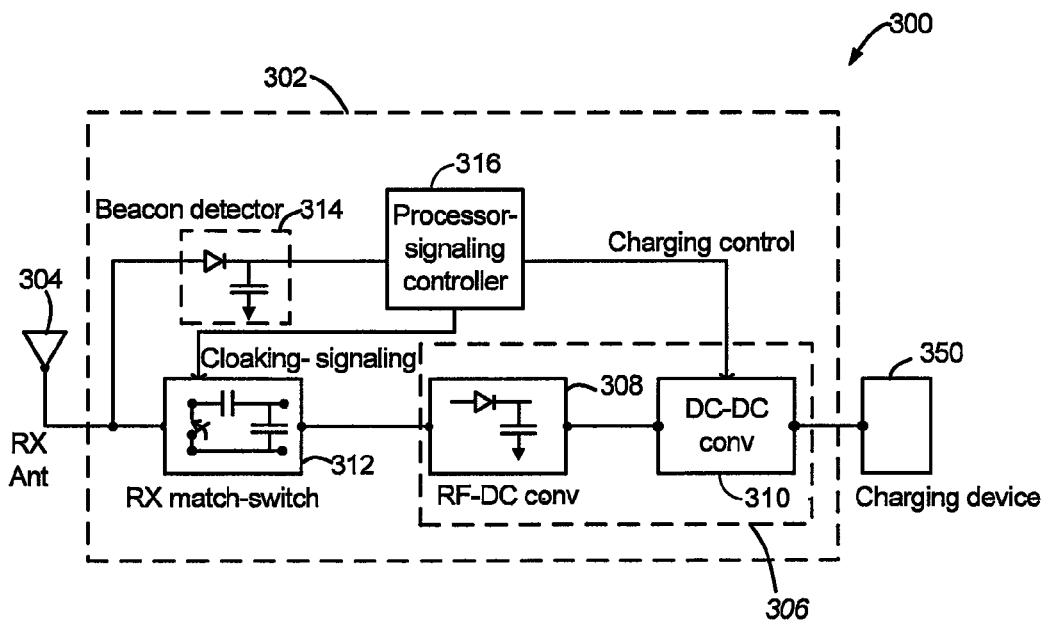
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

The receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2), which can be used to "cloak" the receiver from the transmitter.

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking." Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-field. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

In some exemplary embodiments, the receive circuitry 320 may signal a power requirement to a transmitter in the form of, for example, desired power level, maximum power level, desired current level, maximum current level, desired voltage level, and maximum voltage level. Based on these levels, and the actual amount of power received from the transmitter, the processor 316 may adjust the operation of the DC-DC-to-DC converter 310 to regulate its output in the form of adjusting the current level, adjusting the voltage level, or a combination thereof.

Exemplary embodiments of the present invention are directed to circuits and adjustment mechanisms that allows for adjustment of a load impedance terminating the receive antenna of the receiver device in a way that can compensate for changes in coupling effects between transmit antennas and receive antennas.

Current solutions for adjusting load impedances are based on use of RF components. These include tuners based on switchable fixed capacitors and inductors, voltage variable capacitors (e.g., ferro-electric, Micro-Electro-Mechanical Systems (MEMS), and varactor diodes). The switchable fixed capacitors and inductors approach may have too much ohmic loss to be practical for a charging system. Variable tuners based on ferro-electric devices and MEMs voltage variable capacitors may not be commercially viable at this time. Tuners based on varactor diodes may not be able to handle the RF powers anticipated in wireless power applications.

As described above, wireless charging systems typically include a transmit antenna (i.e., transmit coupling coil), which transmits RF energy to one or more receive antennas (i.e., receive coupling coils) embedded in receiver devices to be charged or otherwise supplied with power. The received energy is rectified, conditioned, and delivered to the device's battery or other operating circuitry. It is typical that these antennas are operated at low frequencies where they are electrically small in order to couple magnetically rather than radiate power.

These small antennas can achieve better coupling efficiency when the two coils are resonant; that is when both are tuned to the frequency used to transfer the power from one antenna to the other. Unfortunately, while efficient power transfer is an important aspect of any wireless power transfer scheme, a byproduct of using small and resonantly coupled antennas is that the resulting bandwidth is sometimes quite small, making the antennas susceptible to detuning and possible dramatic loss in efficiency. Another problem of using small, loosely coupled resonant antennas is that the mutual coupling between the two antennas will vary as the receive antenna is moved around relative to the transmit antenna (e.g., at a different place on a charging pad), or when multiple devices to be charged are placed within close proximity to each other on the charging pad. These placement changes will vary coupling between the transmit and receive coils and result in a variation in the impedance seen at the transmit antenna, resulting in less efficient power transfer between the transmit and receive antennas in the charging system. Many of these issues can be corrected, or at least reduced to a large extent by varying the RF load resistance that is presented to the receive antenna.

In varying the RF load resistance in order to affect a change in the impedance seen by the transmit amplifier, it is well known that this impedance seen by the source can vary resistively, reactively, or a combination thereof, depending on the matching circuits used at the transmit and receive antennas. To maximize the efficiency of the system, it is best to vary only the real value (i.e., resistive value) and hold the reactive value of this input impedance as constant as possible. While it is possible to compensate for reactive changes, this may greatly increase the complexity of the overall system. It can be shown that there is one matching circuit that can meet a goal of maximum power transfer over any range in resistive load variations. That matching circuit may be a tuned (resonant) transformer, which is simply an extension of the resonant transmit and receive antennas used to transfer the power. The use of this form of matching circuit is assumed in the following discussions.

Figure 6:
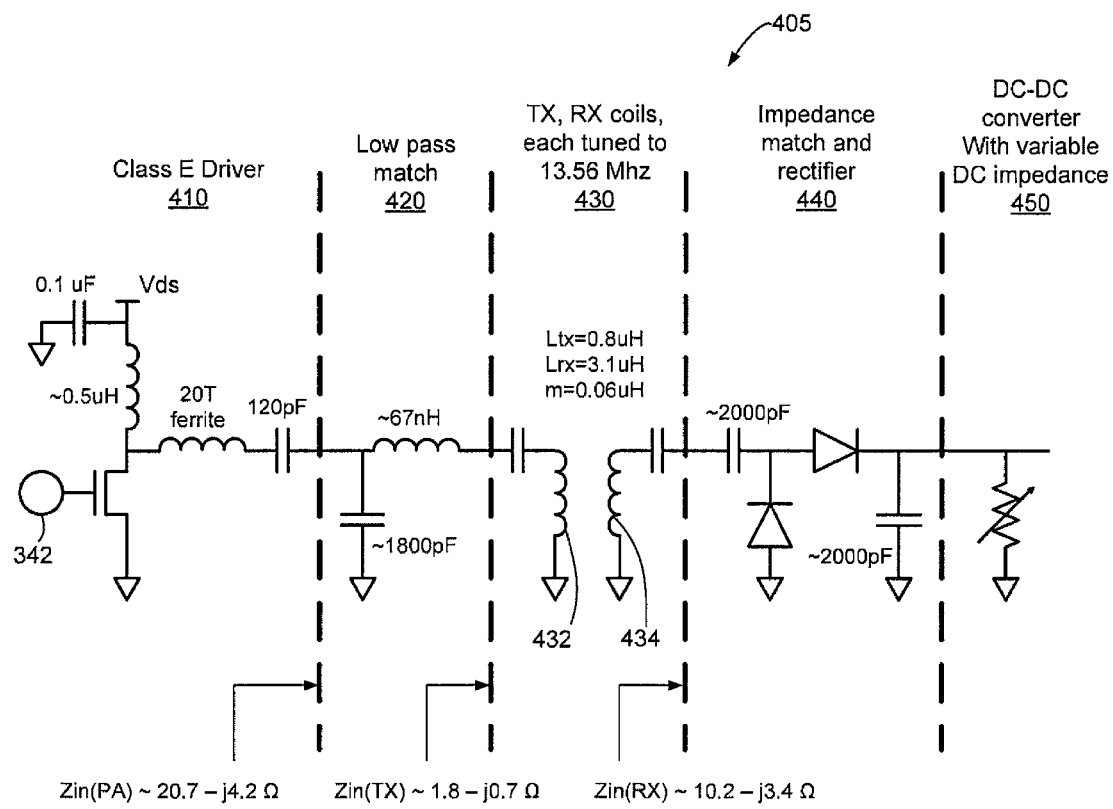
FIG. 6 shows a schematic of transmit circuitry and receive circuitry showing coupling therebetween and an adjustable DC load.

FIG. 6 shows a schematic of transmit circuitry and receive circuitry showing coupling therebetween and an adjustable DC load 450. As shown in FIG. 6, a charging system 405 can be characterized by a coupled coil transformer model 430 where the transmitter electronics are connected to a primary coil 432 (i.e., a transmit antenna) and the rectifier/regulator electronics on the receiver side are connected to a secondary coil 434 (i.e., a receive antenna).

A driver 410 generates an oscillating signal at a desired resonance frequency, such as, for example, about 13.56 MHz. As one example, this driver 41 may be configured as a class E driver as illustrated in FIG. 6. A low pass matching circuit 420 filters and impedance matches the signal from the driver 410 to the transmit antenna 432 of the coupled coil transformer model 430.

Energy is transferred through near field radiation to the receive antenna 434 of the coupled coil transformer model 430. The oscillating signal coupled to the receive antenna 434 is coupled to an impedance match and rectifier circuit 440 to provide an AC impedance match for the receive antenna 434 and rectify the oscillating signal to a substantially DC signal. A DC-to-DC converter 450 converts the DC signal from the rectifier 440 to a DC output useable by circuitry on a receiver device (not shown). The DC-to-DC converter 450 is also configured to adjust the DC impedance seen by the rectifier 440, which in turn adjusts the overall AC impedance of the input to the rectifier 440. As a result, changes in the DC impedance at the input of the DC-to-DC converter 450 can create a better match to the impedance of the receive antenna 434 and better mutual coupling between the receive antenna 434 and the transmit antenna 432.

The self inductances (Ltx and Lrx), mutual inductance (m), and loss resistances of the transformer model 430 may be derived from the measured or simulated coupling characteristics of the antenna pair.

It can be shown that given the mutual inductance (m), and the resistive losses, R1 and R2 of the transmit and receive antennas, respectively, there is an optimum load for the receive antenna that will maximize power transfer efficiency. This optimal load may be defined as:

$$R_{eff} = R1*[1+(\text{omega}*m)^2/(R1*R2)]^{.5}.$$

Typically, $R_{eff}$ may be in a range from 1 to 20 ohms. Through the use of DC load control, the RF load seen by the receive coil 434 can be set to its most efficient value, as the mutual inductance (m) varies due to the reasons described above.

Another use for controlling the RF load is that a variation in load can be used to control the power delivered to the receiver device. This may be at the expense of some efficiency, but enables the maximum use of available power when serving a mix of wireless devices in various charge states.

Yet another use for controlling the RF load is that a variation in load can be used to widen the bandwidth of the transfer function, a result which depends on the matching network 420 between a very low impedance, or reactive impedance, transmit power amplifier 410, typical for wireless changing amplifiers, and the transmitting antenna 432. This bandwidth adjustment may work best over a large variation in the mutual inductance (m) and load if the input matching circuit includes a third tuned inductance (not shown), mutually coupled to the TX antenna 432. In this case, the bandwidth will increase linearly with increasing RF load resistance if the power amplifier has a very low source impedance.

Existing wireless charging systems appear unconcerned about bandwidth, since the FCC allowed signal bandwidth is quite small. As stated before, changing the load to widen the bandwidth may reduce the efficiency somewhat from its maximum value, but this may be useful to maintain a functional charging system when an increased bandwidth may be needed. Although not a substantially desirable option in wireless charging where high efficiency is required, this bandwidth expansion effect can be applied in a short range communication system where efficiency is far less important.

The use of a low inductance mutually coupled to the transmit antenna 432 provides significant system advantages over a more common passive match. This input series tuned DC-to-DC converter 450 results in a second impedance inversion, the first being between the transmit and receive antennas (432 and 434). As a result, when the load impedance increases the input impedance increases. This allows the load to "cloak" the receiver from the transmitter simply by raising the load impedance of the receiver. This effect may be restated as having the input conductance be a linear function of the load conductance.

Without this cloaking feature, the load from the receiver would have to present a short in order to cloak, using a mechanism such as element 312 discussed above with reference to FIG. 5. As a result, a charging pad with no receiver device present would appear as a highly tuned short circuit rather than an open circuit. Furthermore, when multiple uncloaked loads are present the total input conductance for the transmit antenna 432 will be the sum of the individual conductances of the receive antennas 434 and power will be distributed according to their relative value.

Yet another advantage of the tuned input transformer match is that the resulting in/out admittance is real at the center (resonant) frequency and is "flat" topped with respect to frequency. Thus, first order variations in the circuit parameters have little affect on the power transfer process.

Figure 7A:
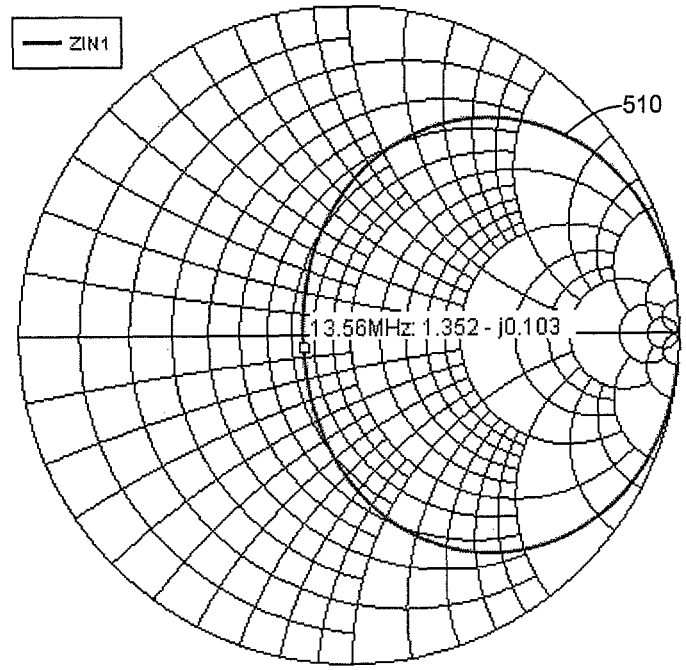
FIGS. 7A-7B show Smith charts illustrating change in input impedance of a coupled coil pair responsive to a change in DC impedance at the receiver device.
Figure 7B:
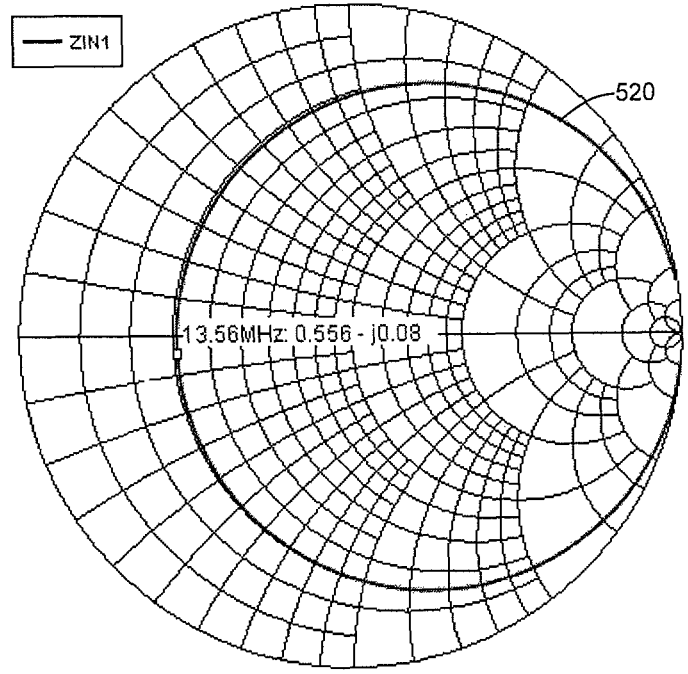

FIGS. 7A-7B show Smith charts illustrating change in input impedance of a coupled coil pair (no inductive match added) responsive to a change in DC impedance at the receiver device. In FIGS. 7A and 7B, the darkened circles 510 and 520, respectively, indicate constant resistance circles.

Referring to FIGS. 7A and 6, a DC impedance $R_{dc}$ of about 10.2 ohms at the input to the DC-to-DC converter 450 results in a complex input impedance at the transmit antenna 432 of about 50 ohms and very little reactance. Referring to FIGS. 7B and 6, a DC impedance $R_{dc}$ of about 80 ohms at the input to the DC-to-DC converter 450 results in a complex input impedance at the transmit antenna 432 of much less than 50 ohms, with very little reactance.

Figure 8A:
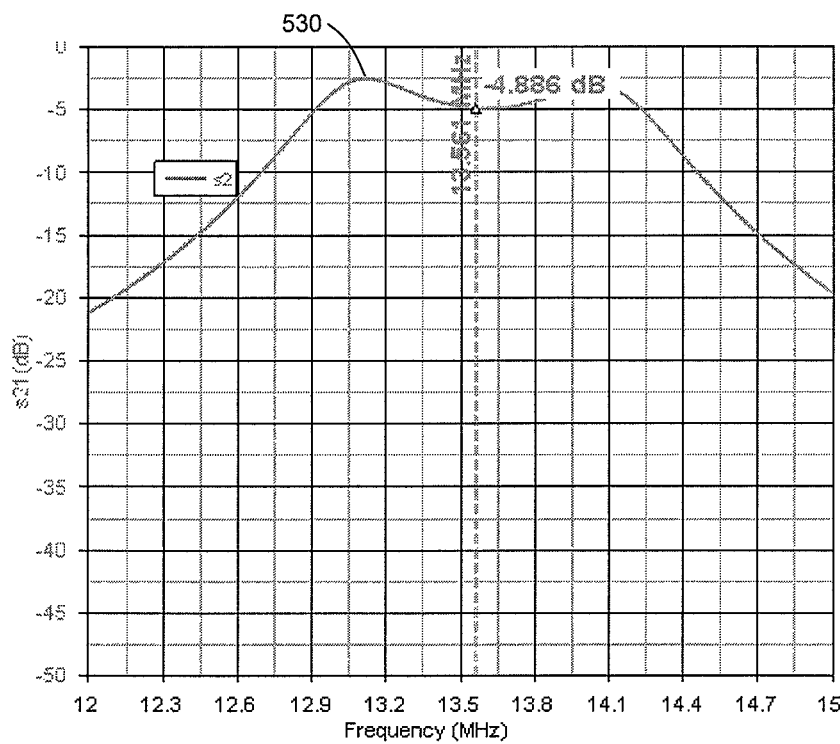
FIGS. 8A-8B show amplitude plots showing improved coupling between a coupled coil pair responsive to a change in DC impedance at the receiver device.
Figure 8B:
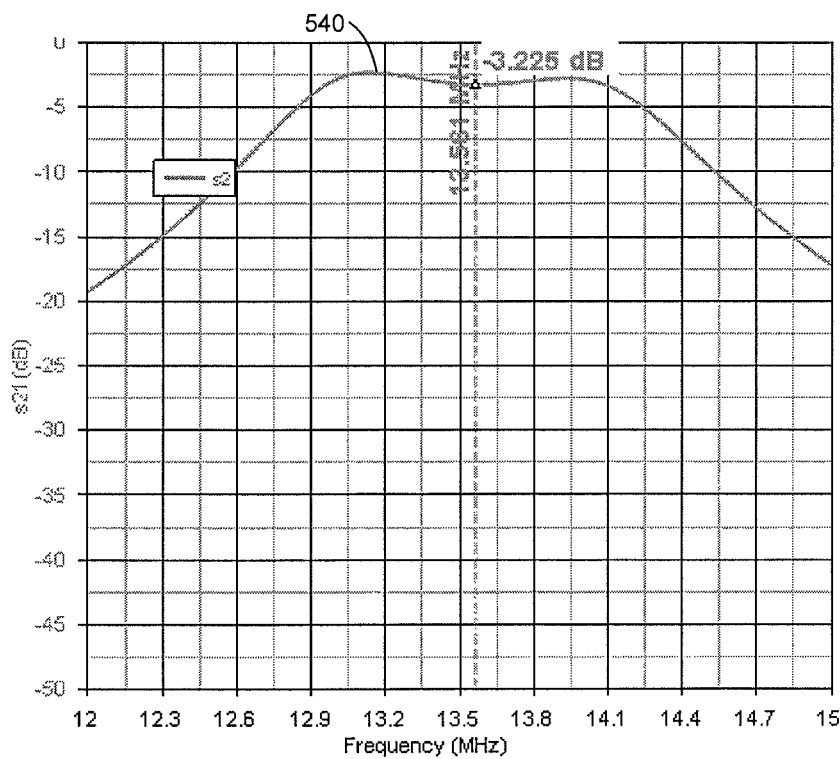

FIGS. 8A and 8B show amplitude plots (530 and 540, respectively) showing improved coupling between a coupled coil pair responsive to a change in DC impedance at the receiver device. In FIG. 8A the amplitude at the center frequency of 13.56 MHz is about −4.886 dB. After adjusting the input impedance to the DC-to-DC converter 450 (FIG. 6), the amplitude at the center frequency of 13.56 MHz is improved to about −3.225 dB resulting in better coupling between the receive antenna and the transmit antenna, which results in more power transferred to the receive antenna.

Figure 9A:
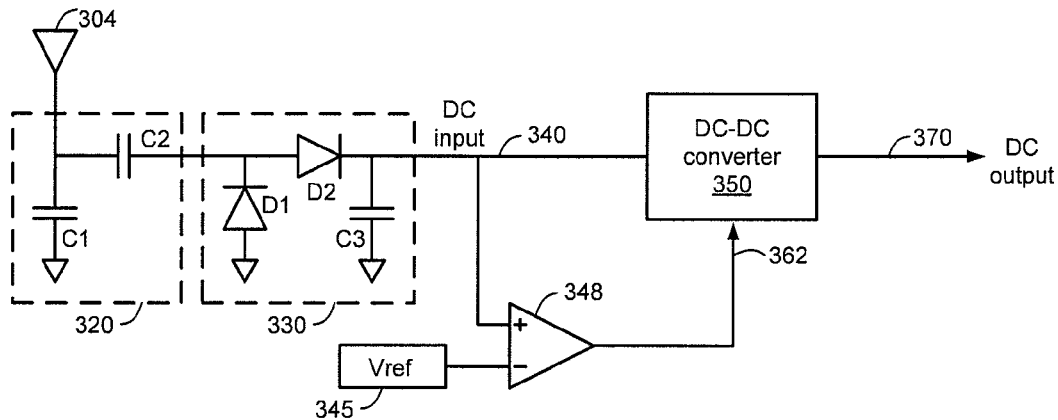
FIGS. 9A-9B show simplified schematics of receiver devices illustrating exemplary embodiments for adjusting DC impedance at the receiver device.
Figure 9B:
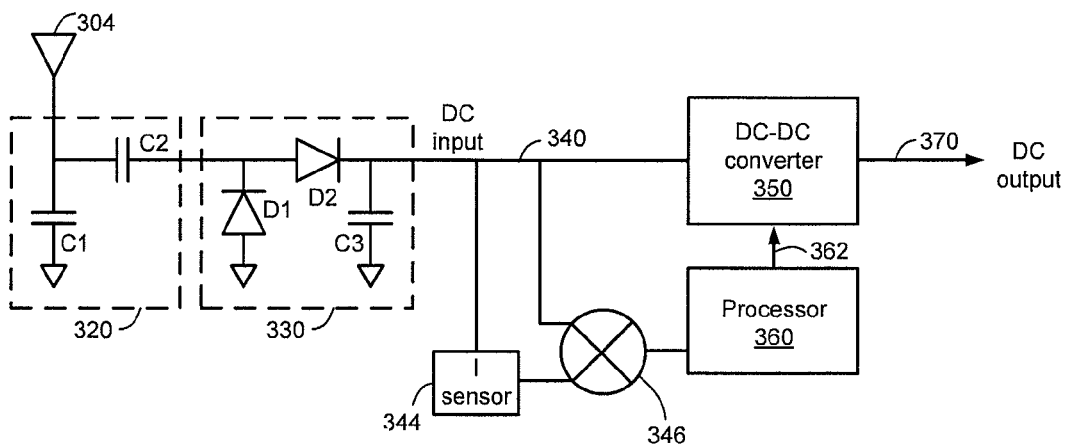

FIGS. 9A-9B show simplified schematics of receiver devices illustrating exemplary embodiments for adjusting DC impedance at the receiver device. In both FIGS. 9A and 9B, the receive antenna 304 feeds an exemplary impedance matching circuit 320 including capacitors C1 and C2. An output from the impedance matching circuit 320 feeds a simple rectifier 330 (as one example) including diodes D1 and D2 and capacitor C3 for converting the RF frequency to a DC voltage. Of course, many other impedance matching circuits 320 and rectifiers 330 are contemplated as within the scope of embodiments of the present invention. A DC-to-DC converter 350 converts the DC input signal 340 from the rectifier to a DC output signal 370 suitable for use by a receiver device (not show).

FIG. 9A illustrates a simple apparatus for maintaining an optimal power point impedance in a wireless power transmission system. A comparator, 348 compares the DC input signal 340 to a voltage reference 345, which is selected such that for a given expected power, the impedance as seen by the transmitter will result in the maximum amount of power coupled to the DC output signal 370. The output 361 of the comparator 348 feeds the DC-to-DC converter 350 with a signal to indicate whether the DC-to-DC converter 350 should increase or decrease its input DC impedance. In embodiments that use a switching DC-to-DC converter 350, this output of the comparator 361 may be converted to a pulse-width-modulation (PWM) signal, which adjusts the input DC impedance, as is explained below. This input voltage feedback circuit regulates input DC impedance by increasing the PWM pulse width as the voltage increases, thus decreasing impedance and voltage.

FIG. 9B illustrates a slightly more complex apparatus for maintaining an optimal power point impedance in a wireless power transmission system. In FIG. 9B, a current sensor 344 may be included and a multiplexer 346 may be used to switch whether voltage or current at the DC input signal 340 is sampled by a processor 360 at any given time. In this system, voltage (Vr) and current (Ir) of the DC input signal 340 is measured, and a PWM signal 362 to the DC-to-DC converter 350 may be varied over a pre-allowed range. The processor 360 can determine which pulse width for the PWM signal 362 produces the maximum power (i.e., current times voltage), which is an indication of the best DC input impedance. This determined pulse width may be used for operation to transfer an optimal amount of power to the DC output signal 370. This sample and adjust process can be repeated as often as desired to track changing coupling ratios, transmit powers or transmit impedances.

As stated earlier, in order to obtain maximum external power from a source with a finite output resistance or impedance, the resistance or impedance of the receiver should be the same as that of the source. In many cases, it is desirable to operate wireless power systems in order to maximize power received, in order to make best use of a limited RF power source.

This maximized power transfer is not always the same as maximum efficiency. In many cases, it may be advantageous to operate the load at a higher than equal impedance or resistance in order to increase the efficiency of the system. In either case, though, maintenance of a specific impedance at the receiver may be useful for regulating the amount of power transferred between a transmitter and a receiver.

In simple wireless power systems, there may be no control of input impedance; the output load (often a battery or wireless device) may be the only driver of the impedance of the system. This leads to a suboptimal transmitter/receiver impedance match, with consequent losses of power transfer, efficiency, or a combination thereof.

DC impedance is defined by (voltage/current). Therefore, at any given current and desired impedance, there exists a desired voltage=(current*desired impedance). With a PWM converter, this desired voltage (and as a result desired impedance) can be achieved by providing a feedback term that compares the input voltage to the (current*desired impedance) term, and adjusts the pulse width up or down to maintain that term.

FIGS. 10A-10D show simplified schematics of receiver devices illustrating exemplary embodiments for adjusting DC impedance at the receiver device using a pulse-width modulation converter. In FIGS. 10A-10D, common elements include the receive antenna 304 feeding an impedance matching circuit 320. An output from the impedance matching circuit 320 feeds a simple rectifier, which is shown simply as diode D3. Of course, many other impedance matching circuits 320 and rectifiers are contemplated as within the scope of embodiments of the present invention. A DC-to-DC converter 350 converts the DC input signal 340 from the rectifier to a DC output signal 370 suitable for use by a receiver device (not show). A processor 360 samples parameters of the DC input signal 340, the DC output signal 270, or a combination thereof and generates a PWM signal 362 for the DC-to-DC converter 350. The DC-to-DC converter 350 is a switch-mode converter wherein the PWM signal 362 controls a switch S1 to periodically charge a filtering circuit including diode D4, inductor L1, and capacitor C4. Those of ordinary skill in the art will recognize the DC-to-DC converter 350 as a buck converter, which converts a voltage on the DC input signal 340 to a lower voltage on the DC output signal 370. While not shown, those of ordinary skill in the art will also recognize that the switch-mode DC-to-DC converter 350 may also be implemented as a boost converter to generate a DC output signal 370 with a voltage that is higher the voltage on the DC input signal 340.

In most cases, a requirement to regulate the output voltage of the wireless power receiver will be most important. For battery charging, for example, it is often critical to not exceed a maximum output current or a maximum output voltage. This means that often the output voltage control term will dominate the control rules for the pulse width of the PWM signal 362.

However, in many cases, the battery will be accepting power at less than its maximum rate. As an example, during the charging of a lithium ion battery at rates less than its rated capacity, the voltage will be below the maximum battery voltage and the current may be limited by the maximum power available from the wireless power system. During these cases, the secondary impedance-control term will become dominant in adjusting the pulse width of the PWM signal in order to control DC impedance.

Exemplary embodiments of the disclosure provide for DC impedance control by using a feedback term in the switch-mode DC-to-DC converter 350 to effectively simulate a steady-state DC resistance in the receiver. In other words, the DC impedance is controlled by adjusting the frequency or duty cycle of the PWM signal 362 to the switch-mode DC-to-DC converter 350 to simulate a given DC impedance.

Feedback for the system is created by sampling one or more characteristics of the DC input signal 340, the DC output signal 370, or a combination thereof by a processor 360. The processor 360 then uses this sampled information, possibly along with other information such as expected power transfer and efficiency of the DC-to-DC converter 350 to adjust the PWM signal 362, which adjust the DC input signal and the DC output signal to close the feedback loop.

Individual differences of what is sampled and how the parameters of the PWM signal are generated are discussed with reference to four different exemplary embodiments illustrated as FIGS. 10A-10D.

Figure 10A:
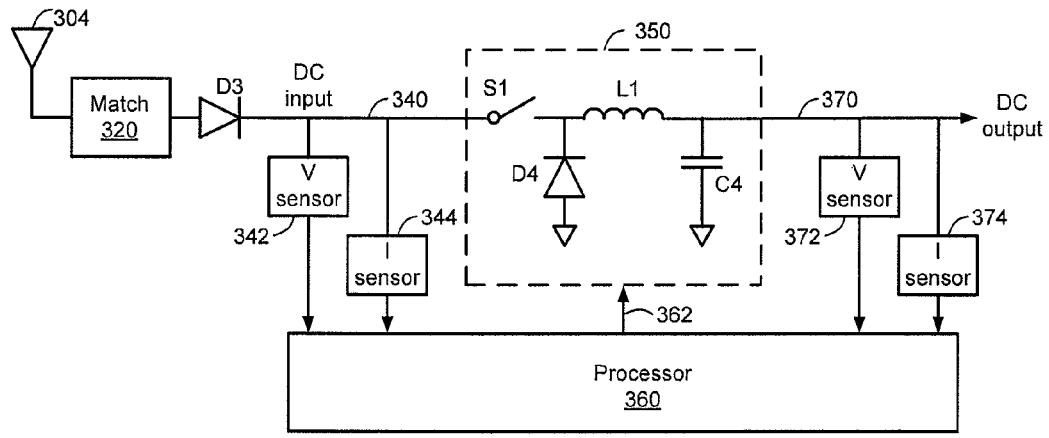
FIGS. 10A-10D show simplified schematics of receiver devices illustrating exemplary embodiments for adjusting DC impedance at the receiver device using a pulse-width modulation converter.

In FIG. 10A, the processor 360 samples a voltage of the DC input signal 340, a current of the DC input signal 340, a voltage of the DC output signal 370, and a current of the DC output signal 370.

In some embodiments, a voltage sensor 342 may be used between the DC input signal 340 and the processor 360. Similarly, a voltage sensor 372 may be used between the DC output signal 370 and the processor 360. In other embodiments the voltage sensors 342 and 372 may not be needed and the processor 460 may directly sample voltages on the DC input signal 340 and the DC output signal 370.

In some embodiments, a current sensor 344 may be used between the DC input signal 340 and the processor 360. Similarly, a current sensor 374 may be used between the DC output signal 370 and the processor 360. In other embodiments the current sensors 344 and 374 may not be needed and the processor 360 may directly sample current on the DC input signal 340 and the DC output signal 370.

With current and voltage measurements of both the DC input signal 340 and the DC output signal 370, the processor 360 can determine all the parameters needed for the power conversion system. Power-in on the DC input signal 340 can be determined as voltage-in times current-in. Power-out on the DC output signal 370 can be determined as voltage-out times current-out. Efficiency of the DC-to-DC converter 350 can be determined as a difference between power-out and power-in. The DC impedance of the DC input signal 340 can be determined as voltage-in divided by current-in.

The processor 360 can periodically sample all of the inputs (e.g., about once every second, or other suitable period) to determine power output at that time. In response, the processor 360 can change the duty cycle of the PWM signal 362, which will change the DC impedance of the DC input signal 340. For example, a narrow pulse width on the PWM signal 362 allows the input voltage to stay relatively high and the input current to stay relatively low, which leads to a higher DC impedance for the DC input signal 340. Conversely, a wider pulse width on the PWM signal 362 allows more current to be drawn from the DC input signal 340, resulting in a lower input voltage and a lower DC impedance for the DC input signal 340.

The periodic sampling and adjusting creates the feedback loop that can find an optimal DC impedance for the DC input signal 340, and as a result, an optimal power for the DC output signal 370. Details of finding these values are discussed below with reference to FIG. 11.

Figure 10B:
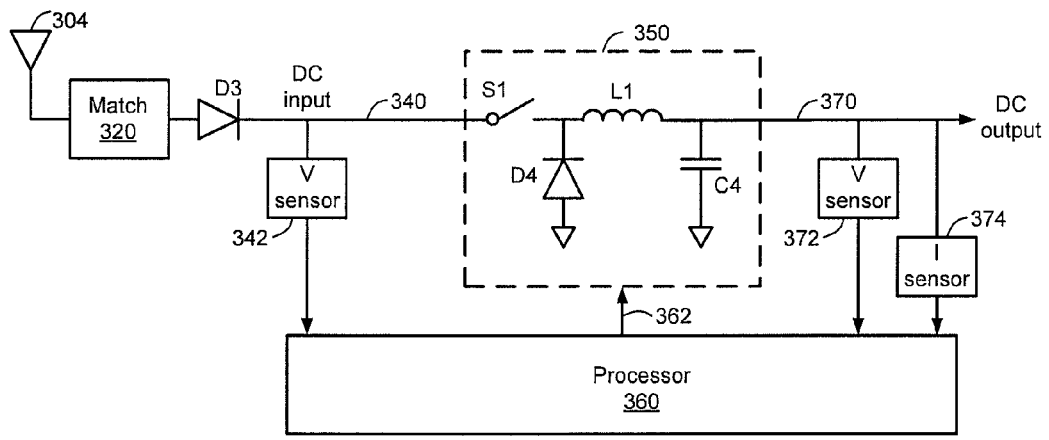

In FIG. 10B, the processor 360 samples a voltage of the DC input signal 340, a voltage of the DC output signal 370, and a current of the DC output signal 370. As explained above with reference to FIG. 10A, the voltage sensor 342, the voltage sensor 372, and the current sensor 374 may be included between their respective signals and the processor 360 depending on the embodiment.

As with FIG. 10A, in FIG. 10B, power-out on the DC output signal 370 can be determined as voltage-out times current-out. In many cases, the efficiency of the DC-to-DC converter 350 will be known and relatively constant over the desired operating range. Thus, the processor 360 can estimate power-in on the DC input signal 340 based on power-out and an estimation of efficiency at the current operation point for the DC-to-DC converter 350. With power-in estimated, and voltage-in measured, the DC impedance of the DC input signal 340 can be determined. Once again, the periodic sampling and adjusting creates the feedback loop that can find an optimal DC impedance for the DC input signal 340, and as a result, an optimal power for the DC output signal 370.

Figure 10C:
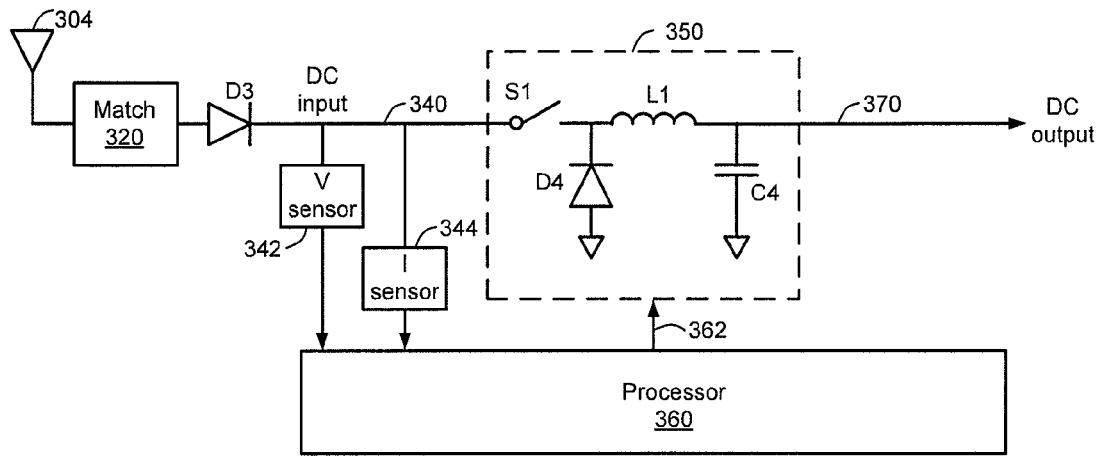

In FIG. 10C, the processor 360 samples a voltage of the DC input signal 340 and a current of the DC input signal 340. As explained above with reference to FIG. 10A, the voltage sensor 342 and the current sensor 344 may be included between the DC input signal 340 and the processor 360 depending on the embodiment.

In FIG. 10C, power-in on the DC input signal 340 can be determined as voltage-in times current-in and the DC impedance of the DC input signal 340 can be determined as voltage-in divided by current-in. As with FIG. 10B, in FIG. 10C the efficiency of the DC-to-DC converter 350 will be known and relatively constant over the desired operating range. Thus, the processor 360 can estimate power-out on the DC output signal 370 based on power-in and an estimation of efficiency at the current operation point for the DC-to-DC converter 350. Once again, the periodic sampling and adjusting creates the feedback loop that can find an optimal DC impedance for the DC input signal 340, and as a result, an optimal power for the DC output signal 370.

Figure 10D:
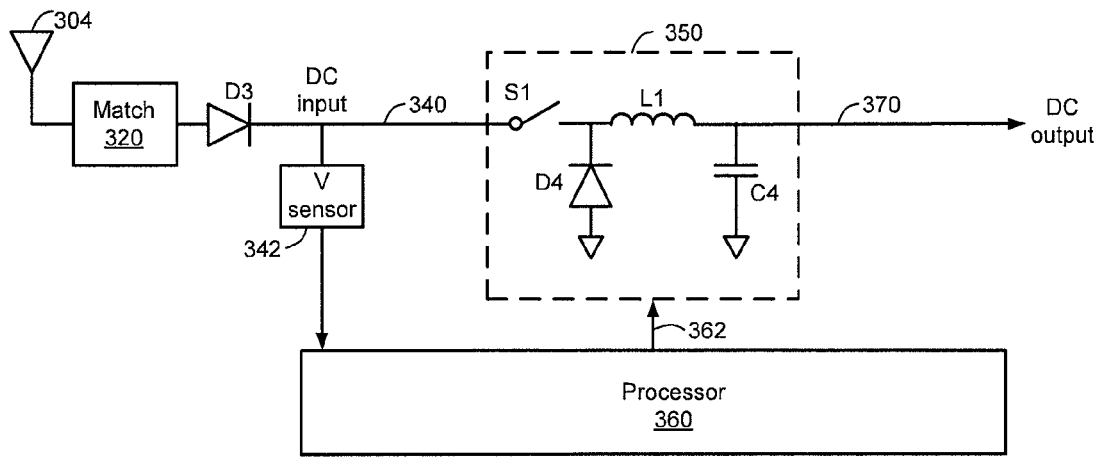

In FIG. 10D, the processor 360 samples only voltage of the DC input signal 340. As explained above with reference to FIG. 10A, the voltage sensor 342 may be included between the DC input signal 340 and the processor 360 depending on the embodiment.

In FIG. 10D, a pre-determined estimate can be made as to how much power is expected to be received through the receive antenna and rectifier and delivered on the DC input signal. Using this pre-determined estimate DC impedance of the DC input signal 340 can be determined relative to the voltage-in. As with FIG. 10B, in FIG. 10C the efficiency of the DC-to-DC converter 350 will be known and relatively constant over the desired operating range. Thus, the processor 360 can estimate power-out on the DC output signal 370 based on the pre-determined power-in estimate and an estimation of efficiency at the current operation point for the DC-to-DC converter 350. Once again, the periodic sampling and adjusting creates the feedback loop that can find an optimal DC impedance for the DC input signal 340, and as a result, an optimal power for the DC output signal 370.

The pre-determined power estimate may be a fixed value programmed in to the receiver device or may be communicated to the receiver device from the transmitter device, which may have means for determining how much of the power transmitted will be coupled to that particular receiver device.

Figure 11:
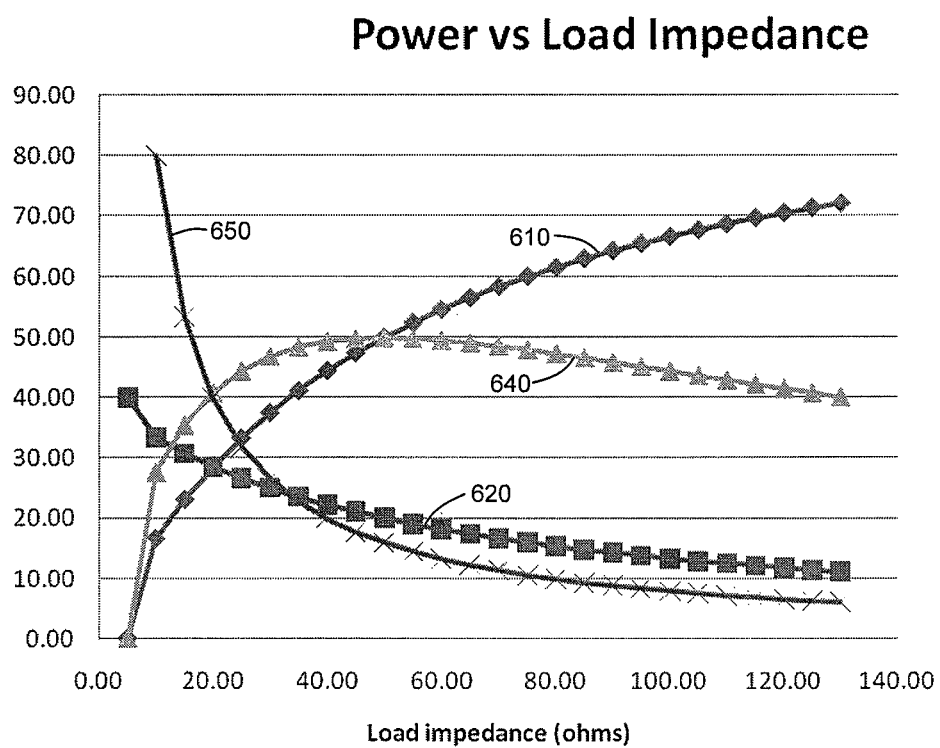
FIG. 11 illustrates various input and output parameters that may be used when adjusting DC impedance at the receiver device

FIG. 11 illustrates various input and output parameters that may be used when adjusting DC impedance at the receiver device. This graph represents a system that has a specific source impedance, but where a load resistor is allowed to vary over a wide range. This load resistor is represented as the variable resistor of the DC-to-DC converter 450 of FIG. 6. Alternatively, the load resistor may be represented by the DC impedance of the DC input signal 340 to the DC-to-DC converter 350 shown in FIGS. 9A-10D.

In FIG. 11, a 50 ohm source impedance is driven by a signal with a 1:1 source-to-load coupling. Line 620 shows the current through the load resistor. Notice as the load impedance increases, the current decreases due to Ohm's Law. Line 610 shows the voltage across the load resistor. Notice that as the load impedance increases, the voltage increases as well per the resistor divider equation.

These two data sets for current and voltage of the load resistor give the power across the load resistor, as shown by line 640. Note that the power peaks at a certain load impedance. In this case (1:1 load coupling) this maximum power point occurs when the load impedance equals, or is near, the source impedance. If the coupling is different, the peak power point may be shifted as well.

Line 650 represents a PWM setting (out of 100) that has an inverse relationship to output impedance. This is the function exhibited by most buck converters. As can be seen, there is one ideal PWM setting that maximizes power received by the load resistor. Wireless power impedance control schemes used with reference to exemplary embodiments discussed herein attempt to discover and maintain this ideal PWM setting.

Of course, as stated earlier, optimal power transfer is not always necessary. Using embodiments of the invention discussed above in FIGS. 6 and 9A-10D, the DC impedance of the DC input signal 340, and as a result the AC impedance of the receive antenna can be effectively de-tuned from optimal power transfer to limit the amount of power delivered on the DC output signal 370. This limiting of power may be useful where the receiver device can not accept the maximum power deliverable from the DC-to-DC converter 350. Some non-limiting examples of this reduced power need may be when a battery in the receiver device is nearing full charge or the DC-to-DC converter 350 can deliver more power than a rated capacity for the battery.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A wireless power receiver, comprising:
    an antenna comprising a resonant circuit having a resonant circuit impedance, the antenna configured to receive a wireless power signal from a wireless power transmitter;
    a rectifier coupled to the antenna and configured to convert the wireless power signal to a direct current input signal, the direct current input signal having voltage and current signals;
    a direct current-to-direct current converter having an converter impedance, the direct current-to-direct current converter configured to generate a direct current output signal based at least in part on the direct current input signal and configured to adjust the converter impedance based at least in part on a control signal, the resonant circuit impedance responsive to adjustments in the converter impedance of the direct current-to-direct current converter; and
    a circuit configured to adjust the control signal based at least in part on one of the voltage signal or the current signal of the direct current input signal.

2. The wireless power receiver of claim 1, wherein the direct current-to-direct current converter is further configured to adjust a power output of the direct current output signal based in part on the voltage signal of the direct current input signal.

3. The wireless power receiver of claim 1, wherein the circuit comprises a pulse modulator.

4. The wireless power receiver of claim 3, wherein the pulse modulator is configured to adjust the control signal based at least in part on one of a voltage of the direct current output signal and a current of the direct current output signal.

5. The wireless power receiver of claim 1, wherein the circuit comprises a comparator configured to generate the control signal based in part on a comparison of the voltage signal of the direct current input signal and a reference signal.

6. The wireless power receiver of claim 1, wherein the pulse modulator comprises a processor configured to:
    receive the direct current input signal;
    sample the direct current input signal to obtain a value; and
    adjust a duty cycle of the control signal based in part on the sampled value, the resonant circuit impedance responsive to the adjustment in the duty cycle of the control signal.

7. The wireless power receiver of claim 6, wherein the processor is further configured to sample at least one of the voltage of the direct current input signal, the current of the direct current input signal, a voltage of the direct current output signal, or a current of the direct current output signal.

8. The wireless power receiver of claim 1, wherein the circuit comprises a processor configured to:
    receive the direct current input signal; and
    sample the direct current input signal to obtain a value, wherein the control signal adjustment is based in part on the sampled value from the direct current input signal to reduce a power output on the direct current output signal to a power level less than a maximum power level allowable by a chargeable device configured to receive the direct current output signal.

9. The wireless power receiver of claim 1, wherein the direct current-to-direct current converter comprises a buck converter or a boost converter configured to receive the direct current input signal, the control signal, and output the direct current output signal.

10. The wireless power receiver of claim 1 wherein the circuit is further configured to adjust a receive bandwidth of the wireless power receiver based at least in part on the resonant circuit impedance.

11. A method, comprising:
    receiving a wireless power signal from a wireless power transmitter at a wireless power receiver including a resonant circuit having a resonant circuit impedance;
    rectifying the wireless power signal to a direct current input signal;
    converting the direct current input signal to a direct current output signal; and
    adjusting a power output of the direct current output signal based in part on the direct current input signal to modify the resonant circuit impedance and to adjust a receive bandwidth of the wireless power receiver.

12. The method of claim 11, wherein adjusting the power output of the direct current output signal further comprises adjusting the power output of the direct current output signal based in part on one or more of a voltage of the direct current input signal and a current of the direct current input signal.

13. The method of claim 11, wherein adjusting the power output of the direct current output signal further comprises adjusting the power output of the direct current output signal based in part on one or more of a voltage of the direct current input signal, a voltage of the direct current output signal, and a current of the direct current output signal.

14. The method of claim 11, wherein adjusting the power output of the direct current output signal further comprises adjusting the power output of the direct current output signal based in part on one or more of a voltage of the direct current input signal, a current of the direct current input signal, a voltage of the direct current output signal and a current of the direct current output signal.

15. The method of claim 11, wherein adjusting the power output of the direct current output signal is based in part on a comparison of the direct current input signal to a voltage reference signal.

16. A wireless power receiver, comprising:
    means for receiving a wireless power signal from a wireless power transmitter, the receiving means having a resonant impedance;
    means for rectifying the wireless power signal to a direct current input signal;
    means for converting the direct current input signal to a direct current output signal; and
    means for modifying an alternating current impedance of the receiving means comprising means for adjusting, based at least in part on the direct current input signal, an input converter impedance of the means for converting the direct current input signal to a direct current output signal based at least in part on the direct current input signal, to modify the resonant impedance.

17. The wireless power receiver of claim 16, wherein the means for adjusting the converter impedance of the means for converting further comprises means for adjusting the power output of the direct current output signal from the means for converting the direct current input signal to a direct current output signal based in part on one or more of a voltage of the direct current input signal and a current of the direct current input signal.

18. The wireless power receiver of claim 16, wherein the means for adjusting the converter impedance of the means for converting further comprises means for adjusting the power output of the direct current output signal from the means for converting the direct current input signal to a direct current output signal based in part on one or more of a voltage of the direct current input signal, a voltage of the direct current output signal, and a current of the direct current output signal.

19. The wireless power receiver of claim 16, wherein the means for adjusting the converter impedance of the means for converting further comprises means for adjusting the power output of the direct current output signal from the means for converting the direct current input signal to a direct current output signal based in part on one or more of the direct current input signal, a current of the direct current input signal, a voltage of the direct current output signal and a current of the direct current output signal.

20. The wireless power receiver of claim 16, further comprising means for comparing the direct current input signal to a voltage reference signal to determine a value, the means for adjusting the converter impedance of the means for converting configured to adjust the converter impedance of the means for converting based in part on the value.

21. The wireless power receiver of claim 16, further comprising means for adjusting a receive bandwidth of the resonant impedance.

* * * * *